US009383746B2

(12) United States Patent
Ha et al.

(10) Patent No.: US 9,383,746 B2
(45) Date of Patent: Jul. 5, 2016

(54) SELF-DIAGNOSIS SYSTEM OF HOME APPLIANCE AND OPERATION METHOD OF THE SAME

(75) Inventors: Chang Ho Ha, Suwon-si (KR); Jin Seung Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 644 days.

(21) Appl. No.: 13/472,965

(22) Filed: May 16, 2012

(65) Prior Publication Data

US 2012/0303323 A1    Nov. 29, 2012

(30) Foreign Application Priority Data

May 25, 2011    (KR) .......................... 10-2011-0049332

(51) Int. Cl.
*G06F 11/30*       (2006.01)
*G05B 23/02*       (2006.01)
*D06F 33/02*       (2006.01)
*D06F 39/00*       (2006.01)

(52) U.S. Cl.
CPC .............. *G05B 23/027* (2013.01); *D06F 33/02* (2013.01); *D06F 39/005* (2013.01); *G05B 2219/24001* (2013.01); *G05B 2219/24048* (2013.01); *G05B 2219/24054* (2013.01); *G05B 2219/2613* (2013.01)

(58) Field of Classification Search
CPC ................. D06F 33/02; D06F 39/005; G05B 2219/24001; G05B 2219/24048; G05B 2219/24054; G05B 2219/2613
USPC .................................................. 702/182–185
See application file for complete search history.

(56) References Cited

U.S. PATENT DOCUMENTS

| 4,049,969 | A  | * | 9/1977  | Salonimer et al. ......... 250/458.1 |
| 4,245,310 | A  |   | 1/1981  | Kiefer |
| 7,808,368 | B2 |   | 10/2010 | Ebrom et al. |
| 2006/0056855 | A1 | * | 3/2006 | Nakagawa et al. ........... 398/183 |
| 2006/0086796 | A1 |   | 4/2006 | Onogi |
| 2008/0192639 | A1 | * | 8/2008 | Narayanan et al. ........... 370/245 |
| 2009/0108057 | A1 | * | 4/2009 | Mu et al. ....................... 235/375 |

(Continued)

FOREIGN PATENT DOCUMENTS

| EP | 1093753 A2 | * | 4/2001 |
| EP | 1 186 695 A2 |   | 3/2002 |

(Continued)

OTHER PUBLICATIONS

Machine translation of DE 19950963A1, related to EP 1093753 A2.*

*Primary Examiner* — An Do
(74) *Attorney, Agent, or Firm* — Staas & Halsey LLP

(57) ABSTRACT

Disclosed are a self-diagnosis system of a home appliance and operation method of the same that self-diagnose and display a state of a home appliance having a self-diagnosis function, recognize and analyze the displayed self-diagnosis information, and provide proper service information corresponding to the state of the home appliance. A state of a home appliance having a self-diagnosis function is self-diagnosed, the diagnosed result is displayed as various images, such as a 7-segment image, QR code, and LED or sound type Morse code, self-diagnosis information displayed as the images is recognized and analyzed, and proper service information is provided to a user or a service provider, thereby easily checking a problem cause of the home appliance.

12 Claims, 13 Drawing Sheets

(56) References Cited

U.S. PATENT DOCUMENTS

2010/0259404 A1 10/2010 Cho et al.
2011/0022358 A1* 1/2011 Han et al. ............. 702/183

FOREIGN PATENT DOCUMENTS

| JP | 2006-050651 | 2/2006 |
|---|---|---|
| JP | 2006-190324 | 7/2006 |

* cited by examiner

SELF-DIAGNOSIS SYSTEM OF HOME APPLIANCE AND OPERATION METHOD OF THE SAME

CROSS-REFERENCE TO RELATED APPLICATIONS

This application claims the benefit of Korean Patent Application No. 10-2011-0049332, filed on May 25, 2011 in the Korean Intellectual Property Office, the disclosure of which is incorporated herein by reference.

BACKGROUND

1. Field

One or more embodiments of the present disclosure relate to a self-diagnosis system of a home appliance and an operation method of the same that self-diagnose and display a state of a home appliance and provide proper service information using the displayed self-diagnosis information.

2. Description of the Related Art

Generally, a home appliance (for example, a washing machine, a refrigerator or an air conditioner) may be configured to display operation information generated during a predetermined operation thereof and information regarding various problems as simple error codes so that a user may check a state of the home appliance.

To check a state of the home appliance using the displayed error code, however, the user may need to have in-depth knowledge of a user manual or may need to contact a service center to ask advice on a state of the home appliance or to to reserve a visit from a service technician. Generally, the error code is displayed as a code value, which may not be familiar to the user. For this reason, the user may have difficulty in coping with a problem related to the home appliance. Furthermore, the displayed information is limited with the result that, although the service center is contacted, the user may have difficulty in correctly explaining a state of the home appliance.

A service technician may need to visit the user to to determine the cause of the problem with the home appliance. However, if the service technician does not acquire correct information regarding a state of the home appliance beforehand and thus does not prepare parts which will be used to repair the home appliance, the service technician may need to visit the user again, thereby increasing time and expense, which may reduce user convenience and increase service expenses.

SUMMARY

It is an aspect of the present disclosure to provide a self-diagnosis system of a home appliance and an operation method of the same that self-diagnose and display a state of a home appliance having a self-diagnosis function, recognize and analyze the displayed self-diagnosis information, and provide proper service information corresponding to the state of the home appliance.

Additional aspects of the disclosure will be set forth in part in the description which follows and, in part, will be obvious from the description, or may be learned by practice of the disclosure.

In accordance with one aspect of the present disclosure, a self-diagnosis system of a home appliance includes a home appliance configured to display self-diagnosis state information as a 7-segment image, a service server to receive the self-diagnosis information displayed as the 7-segment image, to analyze a problem state of the home appliance, and to provide service information regarding the analyzed problem state of the home appliance, and a device to recognize the self-diagnosis information displayed on the home appliance as the 7-segment image and to transmit the recognized self-diagnosis information to the service server.

The home appliance may include a memory to store one or more pieces of diagnosis data constituting production information of the home appliance for self-diagnosis, a controller to generate self-diagnosis information using diagnosis data stored in the memory and to encode the self-diagnosis information, thereby generating 7-segment image information, and a display unit to display the generated 7-segment image information.

The display unit may include a 7-segment image constituted by a combination of light emitting diodes (LEDs), and the controller may independently turn the LEDs on or off to display the self-diagnosis information of the home appliance through the display unit.

Also, the display unit may include a plurality of 7-segment images constituted by a combination of LEDs, and the controller may independently control the 7-segment images to display the self-diagnosis information of the home appliance through the display unit.

The service server may analyze the self-diagnosis information transmitted from the device and transmit service information obtained through diagnosis of a problem of the home appliance to the device or a service center.

Also, the service server may receive information regarding a user who uses the device and analyze the received user information to determine whether the user is capable of repairing the home appliance.

Also, the service server may transmit the service information to the device upon determining that the user is capable of repairing the home appliance, and may transmit the service information to the service center upon determining that the user is not capable of repairing the home appliance.

The device may have a camera to recognize the self-diagnosis information displayed on the home appliance as the 7-segment image.

Also, the device may have an exclusive application to remove noise from the recognized 7-segment image.

Also, the device may transmit and receive information to and from the service server through a network.

The network may include a ZigBee network, a WiFi network, a Bluetooth network and a mobile network.

In accordance with another aspect of the present disclosure, a self-diagnosis system of a home appliance includes a home appliance configured to display self-diagnosis state information as one selected from among a 7-segment image, quick response (QR) code, and LED or sound type Morse code, a service server to receive the self-diagnosis information displayed as one selected from among the 7-segment image, QR code, and LED or sound type Morse code, to analyze a problem state of the home appliance, and to provide service information regarding the analyzed problem state of the home appliance, and a device to recognize the self-diagnosis information displayed on the home appliance as one selected from among the 7-segment image, QR code, and LED or sound type Morse code, and to transmit the recognized self-diagnosis information to the service server.

The home appliance may include a memory to store one or more pieces of diagnosis data constituting production information of the home appliance for self-diagnosis, a controller to generate self-diagnosis information using diagnosis data stored in the memory and to encode the self-diagnosis information, thereby generating information of one selected from among the 7-segment image, QR code, and LED or sound type Morse code, and a display unit to display the generated information of one selected from among the 7-segment image, QR code, and LED or sound type Morse code.

The controller may include a first generation unit to encode the self-diagnosis information generated using the diagnosis data, thereby generating 7-segment image information, a second generation unit to encode the self-diagnosis information generated using the diagnosis data, thereby generating QR code type image information, and a third generation unit to encode the self-diagnosis information generated using the diagnosis data, thereby generating LED or sound type Morse code information.

The device may have an exclusive application to remove noise from one selected from among the 7-segment image, QR code, and LED or sound type Morse code.

In accordance with another aspect of the present disclosure, an operation method of a self-diagnosis system of a home appliance includes self-diagnosing a state of a home appliance and displaying the state of the home appliance as a 7-segment image, recognizing self-diagnosis information displayed as the 7-segment image through a device, receiving the self-diagnosis information recognized through the device and analyzing a problem state of the home appliance, and providing service information regarding the analyzed problem state of the home appliance.

The displaying the self-diagnosis information as the 7-segment image may include generating self-diagnosis information using diagnosis data stored in a memory, encoding the self-diagnosis information to generate 7-segment image information, and independently turning 7 LEDs on or off according to the generated 7-segment image information to display the self-diagnosis information through a display unit.

Also, the displaying the self-diagnosis information as the 7-segment image may include generating self-diagnosis information using diagnosis data stored in a memory, encoding the self-diagnosis information to generate 7-segment image information, and independently controlling a plurality of 7-segment images according to the generated 7-segment image information to display the self-diagnosis information through a display unit.

The providing the service information may include analyzing the recognized self-diagnosis information and transmitting service information obtained through diagnosis of a problem of the home appliance to the device or a service center.

Also, the providing the service information may include receiving information regarding a user who uses the device, analyzing the received user information to determine whether the user is capable of repairing the home appliance, and transmitting the service information to the device upon determining that the user is capable of repairing the home appliance.

Also, the providing the service information may include receiving information regarding a user who uses the device, analyzing the received user information to determine whether the user is capable of repairing the home appliance, and transmitting the service information to the service center upon determining that the user is not capable of repairing the home appliance.

In accordance with a further aspect of the present disclosure, an operation method of a self-diagnosis system of a home appliance includes self-diagnosing a state of a home appliance and displaying the state of the home appliance as one selected from among a 7-segment image, QR code, and LED or sound type Morse code, recognizing self-diagnosis information displayed as one selected from among the 7-segment image, QR code, and LED or sound type Morse code through a device, receiving the self-diagnosis information recognized through the device and analyzing a problem state of the home appliance, and providing service information regarding the analyzed problem state of the home appliance.

The displaying the self-diagnosis information as one selected from among the 7-segment image, QR code, and LED or sound type Morse code may include generating self-diagnosis information using diagnosis data stored in a memory, encoding the self-diagnosis information to generate image information of one selected from among the 7-segment image, QR code, and LED or sound type Morse code, and displaying the self-diagnosis information through a display unit according to the generated image information of one selected from among the 7-segment image, QR code, and LED or sound type Morse code.

In accordance with one aspect of the present disclosure, a self-diagnosis system includes a home appliance configured to display self-diagnosis state information as an image on a display, a device to collect the self-diagnosis state information displayed on the display as the image and to transmit the self-diagnosis state information, and a service server to receive the self-diagnosis state information transmitted by the device, to analyze a problem state of the home appliance based on the received self self-diagnosis state information, and to provide service information regarding the analyzed problem state of the home appliance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
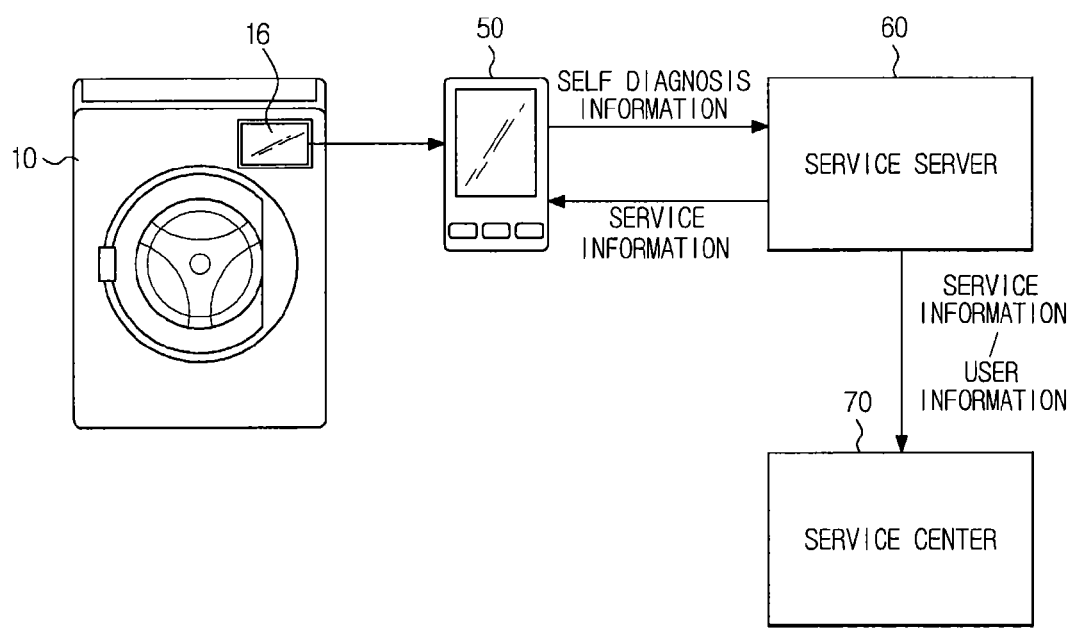
FIG. 1 is a view showing the overall construction of a self-diagnosis system of a home appliance according to an embodiment of the present disclosure.

Reference will now be made in detail to the embodiments of the present disclosure, examples of which are illustrated in the accompanying drawings, wherein like reference numerals refer to like elements throughout.

FIG. 1 is a view showing the overall configuration of a self-diagnosis system of a home appliance according to an embodiment of the present disclosure.

Referring to FIG. 1, a self-diagnosis system may include, for example, a home appliance 10 configured to perform self-diagnosis, a device 50 to recognize and transmit self-diagnosis information of the home appliance 10, and a service server 60 to analyze the self-diagnosis information transmitted from the device 50 and provide proper service information.

The home appliance 10 self-diagnoses an operation state and a problem state of the home appliance 10 using a self-diagnosis program incorporated therein, and displays self-diagnosis information regarding the operation state and the problem state of the home appliance 10 through a display unit 16.

The home appliance 10 may include various electronic products, such as a washing machine, refrigerator, microwave oven, television and air conditioner.

The self-diagnosis program incorporated in the home appliance 10 self-diagnoses an operation state and a problem state of the home appliance 10 occurring during operation of the home appliance 10. The self-diagnosis program may be an application such as an exclusive application incorporated within the home appliance 10.

The display unit 16 may be a light emitting unit, such as an light emitting diode (LED) display, liquid crystal display (LCD) or an organic electroluminescent display, to display self-diagnosis information regarding the operation state and the problem state of the home appliance 10 in the form of various images, such as a 7-segment image, quick response (QR) code, and LED or sound type Morse code.

A method of displaying such images, such as a 7-segment image, QR code, and LED or sound type Morse code, through the display unit 16 of the home appliance 10 will be described below with reference to FIGS. 4, 7 and 10.

The device 50 recognizes self-diagnosis information displayed on the display unit 16 of the home appliance 10 in the form of images, such as a 7-segment image, QR code, and LED or sound type Morse code, and transmits the recognized self-diagnosis information to the service server 60. The device 50 may include all devices, and may be embodied in or as any portable electronic device such as a communication terminal, a smart phone, or a digital camera. The device 50 may be configured to be connected to a network and may include a camera.

That is, the device 50 collects self-diagnosis information displayed in the form of images, such as a 7-segment image, QR code, and LED or sound type Morse code using the camera and transmits the collected self-diagnosis information to the service server 60.

Also, the device 50 may remove noise from the images, such as the 7-segment image, QR code, and LED or sound type Morse code, using an exclusive application incorporated therein before transmitting the self-diagnosis information to the service server 60, thereby correctly extracting the self-diagnosis information.

In addition, the device 50 may transmit and receive information to and from the service server 60 using a non-secure or secure communication protocol. A network to transmit and receive information using the secure communication protocol may include a ZigBee network, a WiFi network, a Bluetooth network, and a mobile network.

Consequently, the device 50 may collect self-diagnosis information images displayed on the display unit 16 of the home appliance 10 in the form of images, such as a 7-segment image, QR code, and LED or sound type Morse code using the camera and removes noise from the images, such as the 7-segment image, QR code, and LED or sound type Morse code, using the exclusive application, thereby correctly extracting the self-diagnosis information. Subsequently, the device 50 may transmit the extracted self-diagnosis information to the service server 60 using the secure communication protocol.

The service server 60 may analyze the self-diagnosis information transmitted from the device 50 and may transmit proper service information, i.e. diagnosis result information regarding an operation state and a problem state of the home appliance 10, to the device 50 or a service center 70.

The self-diagnosis result information may be transmitted from the service server 60 to the device 50 or the service center 70 as follows.

First, upon receiving self-diagnosis information of the home appliance 10 through the device 50, the service server 60 also receives information regarding a user who uses the device 50 and analyzes the received user information to extract user-tailored information.

The user-tailored information, including age, sex, occupation and interest of the user analyzed based on the user information, is used to determine whether the user is capable of performing repair.

For example, generally, males in their twenties and thirties are familiar with machines or machine repair. Consequently, the service server 60 determines based on user-tailored information extracted through user information whether the user is capable of or interested in performing repair. Upon determining that the user is capable of or interested in performing repair, the service server 60 transmits diagnosis result information regarding a state of the home appliance 10, i.e. service information proper to repair the home appliance 10, to the device 50.

For a user, such as a female, an older person, or a child, who is not familiar with machines or may have difficulty or lack of interest in performing repair, on the other hand, the service server 60 determines based on user-tailored information extracted through user information whether the user is incapable of or disinterested in performing repair. Upon determining that the user is disinterested in or incapable of performing repair, the service server 60 transmits diagnosis result information regarding a state of the home appliance 10, i.e. service information proper to repair the home appliance 10, to the service center 70.

Also, the service server 60 stores the service information, i.e. the self-diagnosis result information of the home appliance 10, so that the stored service information may be used for after-sales service.

Figure 2:
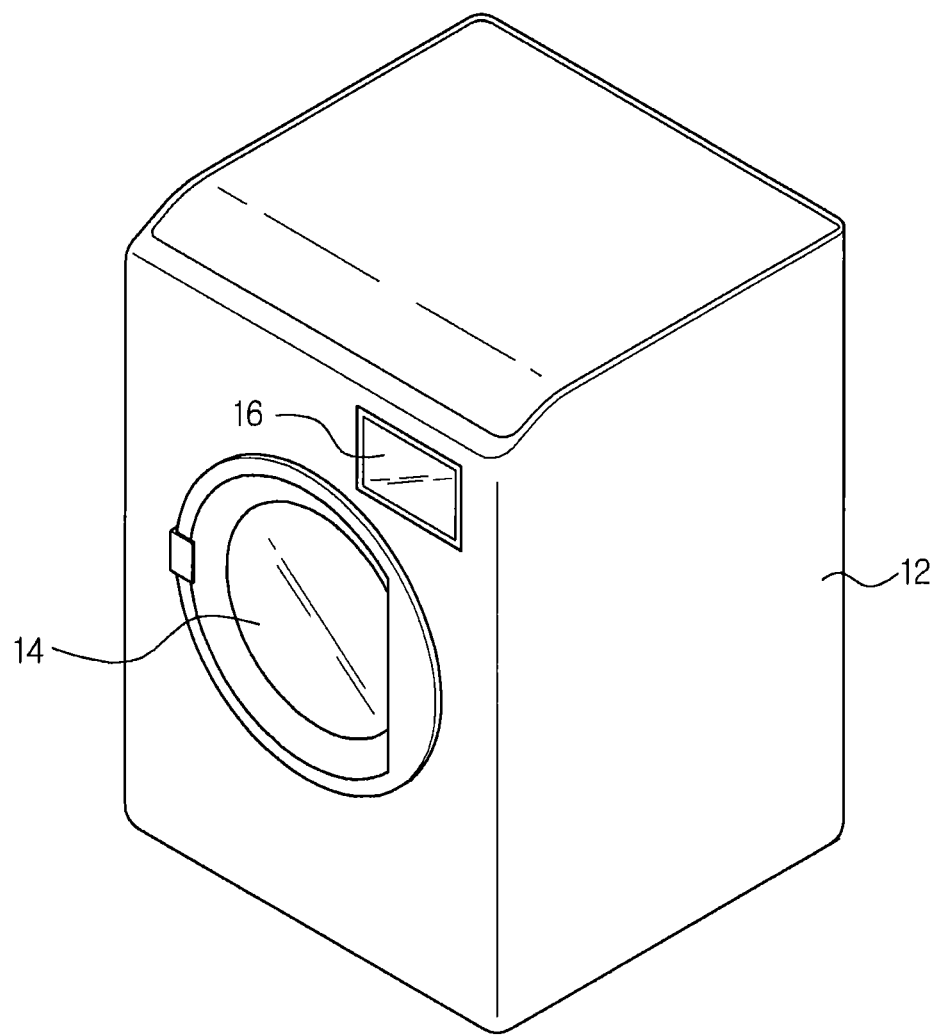
FIG. 2 is a view showing an example of a home appliance according to an embodiment of the present disclosure.

FIG. 2 is a view showing an example of a home appliance according to an embodiment of the present disclosure.

Referring to FIG. 2, a washing machine, as an example of the home appliance 10, includes a main body 12, configured approximately in the shape of a box, forming the external appearance thereof, a door 14 mounted at the front of the main body 12 to allow laundry to be introduced therethrough, and a display unit 16 mounted at the top of the main body 12 to provide a user interface and to display information regarding an operation state and a problem state thereof in the form of images, such as a 7-segment image, QR code, and LED or sound type Morse code.

Figure 3:
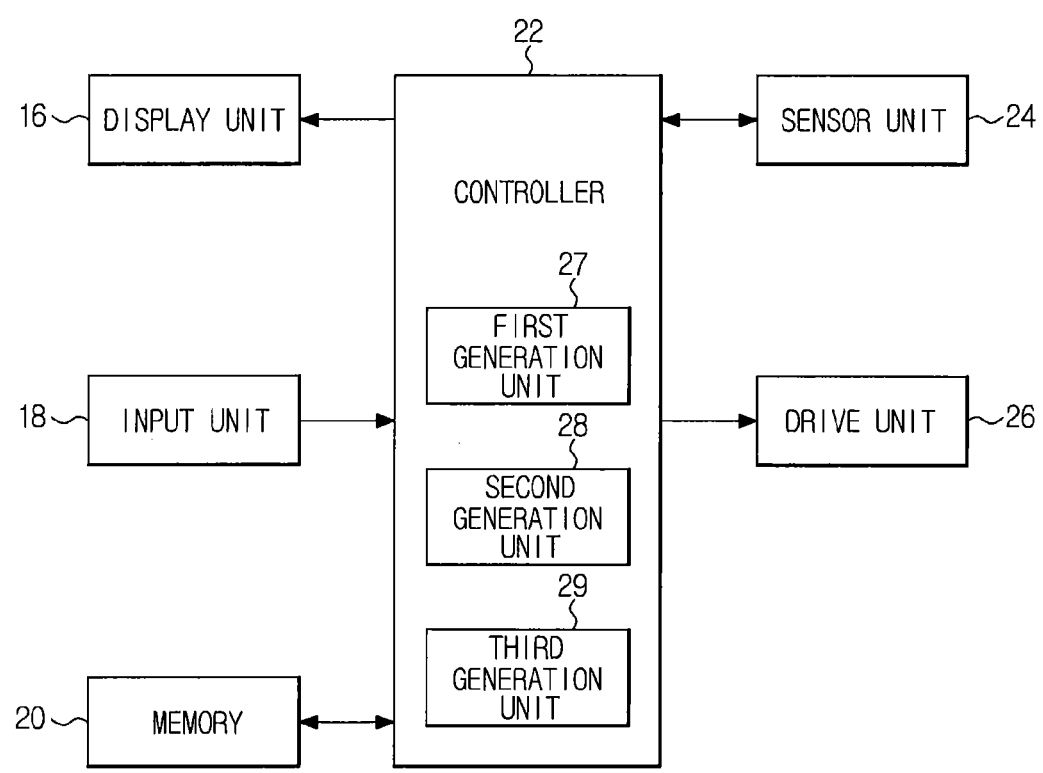
FIG. 3 is a control block diagram of the home appliance according to the embodiment of the present disclosure.

FIG. 3 is a control block diagram of the home appliance according to the embodiment of the present disclosure.

Referring to FIG. 3, the home appliance 10 self-diagnoses an operation state and a problem state of the home appliance 10 using a self-diagnosis program incorporated therein, and displays self-diagnosis information regarding an operation state and a problem state of the home appliance 10. The home appliance 10 may include a display unit 16, an input unit 18, a memory 20, a controller 22, a sensor unit 24 and a drive unit 26.

The display unit 16 displays self-diagnosis information regarding an operation state and a problem state of the home appliance 10 in the form of images, such as a 7-segment image, QR code, and LED or sound type Morse code, according to a display control signal of the controller 22. A method of displaying such images, such as a 7-segment image, QR code, and LED or sound type Morse code, on the display unit 16 will be described below with reference to FIGS. 4 to 12.

The input unit 18 allows a user to input a command to perform self-diagnosis of the home appliance 10. The input unit 18 may be constituted by a key, button, switch or touchpad. The input unit 18 may include all devices that generate input data through push, contact, pressure or rotation.

The memory 20 stores one or more pieces of diagnosis data constituting production information of the home appliance 10 for self-diagnosis. The memory 20 may include a data storage unit, such as a read-only memory (ROM) or electrically erasable programmable ROM (EEPROM).

Also, the memory 20 stores operation information, such as control data to control the operation of the home appliance 10, reference data used during control of the operation of the home appliance 10, operation data generated while the home appliance 10 performs a predetermined operation, and set data input through the input unit 18 so that the home appliance 10 performs the predetermined operation, use information including the number of times the home appliance 10 has performed a specific operation and model information of the home appliance 10, and problem information including diagnosis data regarding a cause of malfunction of the home appliance 10 or where the home appliance 10 malfunctions.

When a self-diagnosis execution command is input through the input unit 18, the controller 22 generates self-diagnosis information of the home appliance 10 using diagnosis data stored in the memory 20 and encodes the self-diagnosis information of the home appliance 10 to generate display information.

The display information created by the controller 22 is output in the form of images, such as a 7-segment image, QR code, and LED or sound type Morse code.

Also, the controller 22 further includes a first generation unit 27, a second generation unit 28 and a third generation unit 29 to generate image information output as a 7-segment image, QR code, and LED or sound type Morse code.

The first generation unit 27 generates self-diagnosis information of the home appliance 10 using diagnosis data stored in the memory 20 and encodes the self-diagnosis information of the home appliance 10 to generate 7-segment type image information.

The generated 7-segment image information is self-diagnosis information displayed by turning 7 LEDs on or off. The 7 LEDs are turned on or off according to a state of the home appliance 10 self-diagnosed using a self-diagnosis program to display much more self-diagnosis information.

The second generation unit 28 generates self-diagnosis information of the home appliance 10 using diagnosis data stored in the memory 20 and encodes the self-diagnosis information of the home appliance 10 to generate QR code type image information.

The generated QR code type image information is self-diagnosis information containing various kinds of information in a square horizontal and vertical lattice pattern. The QR code is generated according to a state of the home appliance 10 self-diagnosed using a self-diagnosis program to display much more self-diagnosis information.

The third generation unit 29 generates self-diagnosis information of the home appliance 10 using diagnosis data stored in the memory 20 and encodes the self-diagnosis information of the home appliance 10 to generate LED or sound type Morse code information.

The generated LED or sound type Morse code information is self-diagnosis information constituted by a combination of dots and dashes. The LED or sound type Morse code is generated according to a state of the home appliance 10 self-diagnosed using a self-diagnosis program to output much more self-diagnosis information.

The sensor unit 24 detects various kinds of sensor information related to the operation of the home appliance 10 and transmits the detected results to the controller 22. When a self-diagnosis execution command is input through the input unit 18, the controller 22 controls the sensor unit 24 to detect various kinds of sensor information related to the operation of the home appliance 10. The sensor information detected through the sensor unit 24 is information related to a normal state and a problem state of various loads (for example, a washing motor, a fan motor, a water temperature sensor, an air sensor, a condensing sensor, a water level sensor, a door, etc.) related to the operation of the home appliance 10.

The drive unit 26 drives various loads (for example, a washing motor, a fan motor, a water temperature sensor, an air sensor, a condensing sensor, a water level sensor, a door, etc.) related to the operation of the home appliance according to a drive control signal of the controller 22.

Hereinafter, a method of displaying various images, such as a 7-segment image, QR code, and LED or sound type Morse code, through the display unit 16 will be described.

First, a method of displaying self-diagnosis information of the home appliance 10 using a 7-segment image will be described with reference to FIGS. 4 and 5.

Figure 4:
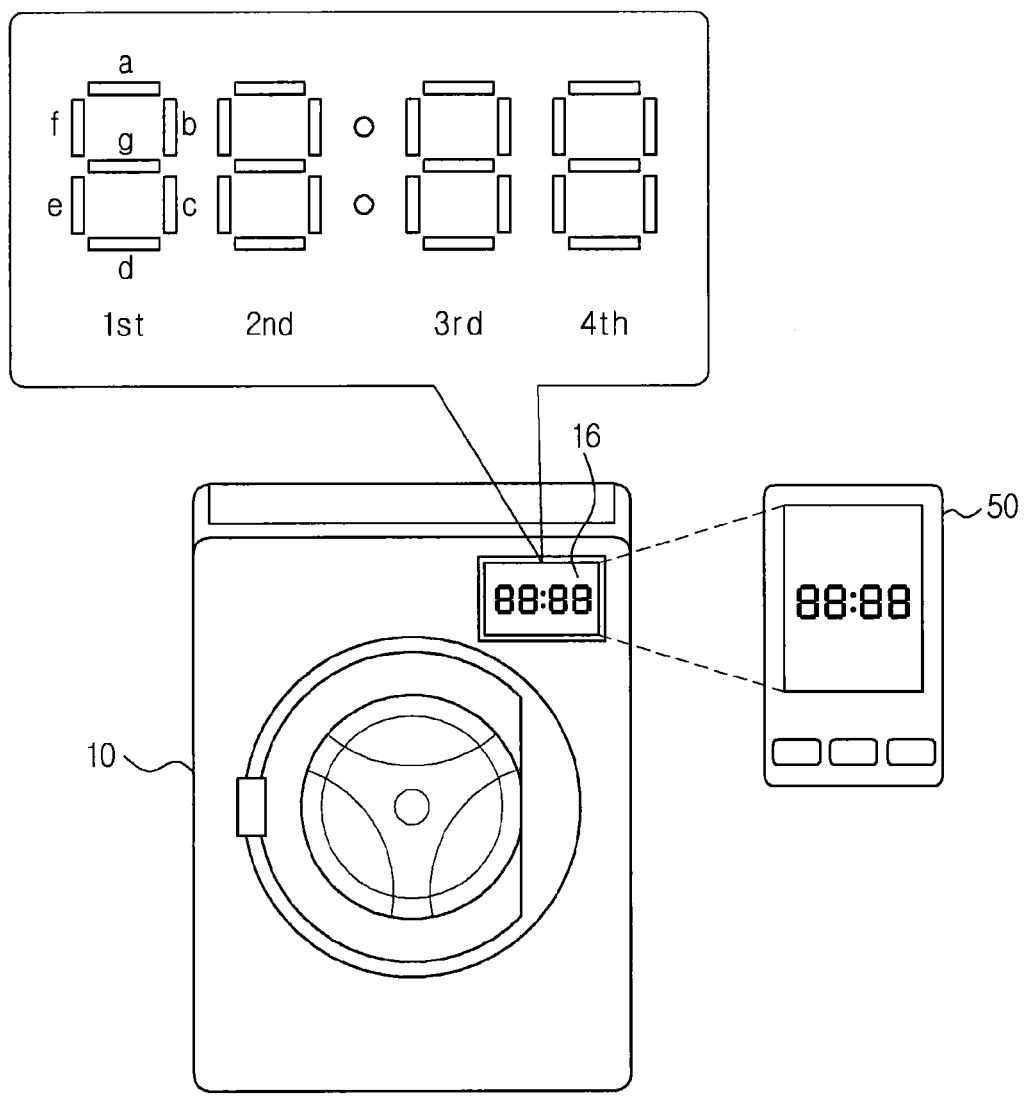
FIG. 4 is a view showing a self-diagnosis information image of the home appliance according to the embodiment of the present disclosure.

FIG. 4 is a view showing a self-diagnosis information image of the home appliance according to the embodiment of the present disclosure.

Referring to FIG. 4, self-diagnosis information of the home appliance 10 is displayed using a 7-segment image.

The 7-segment image is generated by an LED module including LEDs. The LEDs are independently turned on or off to display the self-diagnosis information of the home appliance 10.

Also, the self-diagnosis information of the home appliance 10 may be generated using a plurality (for example, 4) of 7-segment images to display much more information.

In this case, information items displayed by the four (first, second, third and fourth) 7-segment images may be classified as shown in Table 1 below to display an operation state and a problem state of the home appliance 10 and provide all information related to the home appliance 10.

TABLE 1

| | A | b | c | d | e | f | g |
|---|---|---|---|---|---|---|---|
| First | | 3 bits = 8 Manufacture year | | | 4 bits = 16 Manufacture month | | |
| Second | | 2 bits = 3 Function classification | | | 35 bits = 32 Model information | | |
| Third | | | | 7 bits = 128 Use cycles (128 * 28 = 3584 cycles) | | | |
| Fourth | Washing motor | Fan motor | Water temperature sensor | Air sensor | Condensing sensor | Water level sensor | Door |
| | On = normal Off = problem | On = normal Off = problem | On = normal Off = problem | On = normal Off = problem | On = normal Off = problem | On = normal Off = problem | On = normal Off = problem |

As indicated in Table 1, the first 7-segment image is configured to display manufacture year and month of the home appliance 10, the second 7-segment image is configured to display function classification and model information of the home appliance 10, the third 7-segment image is configured to display use cycles of the home appliance 10, and the fourth 7-segment image is configured to display an operation state and a problem state of the home appliance 10.

A designer may change self-diagnosis information displayed using the four 7-segment images according to the specifications of the home appliance 10.

In Table 1, the four 7-segment images are described as an example; however, embodiments of the present disclosure are not limited thereto. Two or more 7-segment images may be used to variously display self-diagnosis information related to the operation of the home appliance 10.

However, the method of displaying self-diagnosis information using the four 7-segment images may be used in some of the washing machines or microwave ovens, and therefore, it may not be possible to equally apply the method of displaying self-diagnosis information using the four 7-segment images to all home appliances. In this embodiment, therefore, the four 7-segment images (a total of 30 LEDs) are indicated in series on a time basis so as to be applied to various home appliances.

Figure 13:
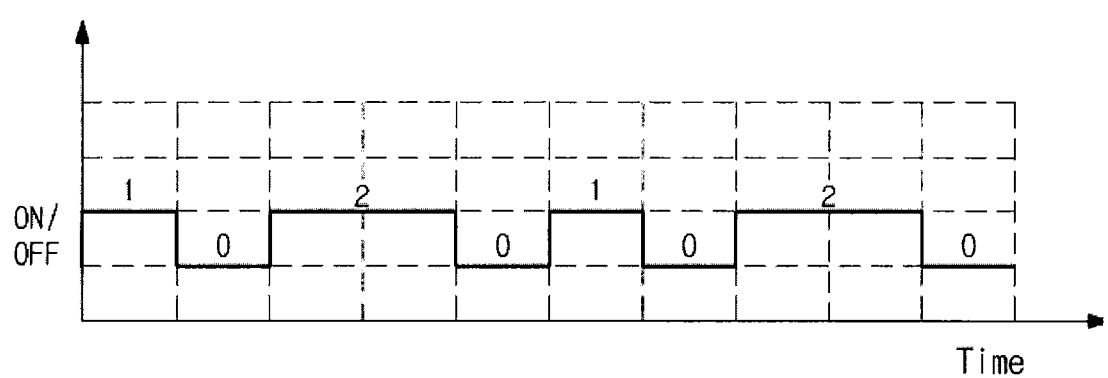
FIG. 13 is a table illustrating display of an operation state and a problem state of the home appliance.

More specifically, as indicated in FIG. 13, an operation state and a problem state of the home appliance 10 may be displayed, and in addition, all information related to the home appliance 10 may be confirmed, using long and short ON signals and a pause signal in a fashion similar to a Morse code.

In FIG. 13, 0 indicates a pause signal, 1 indicates an ON signal of signal 1, and 2 indicates an ON signal of signal 2.

In FIG. 13, lengths of the long and short ON signals and the pause signal may vary based on frames per second (fps) of the camera mounted in the device 50. At the present time, an ON signal and a pause signal per about 142 ms are generated on a 15 fps basis in the shortest case. In this case, direct application may be possible when long and short LED signals are changed into sound. Basically, convenient use is achieved under a condition in which it may be difficult to determine whether or not OFF exists and to confirm the length of OFF.

Figure 5:
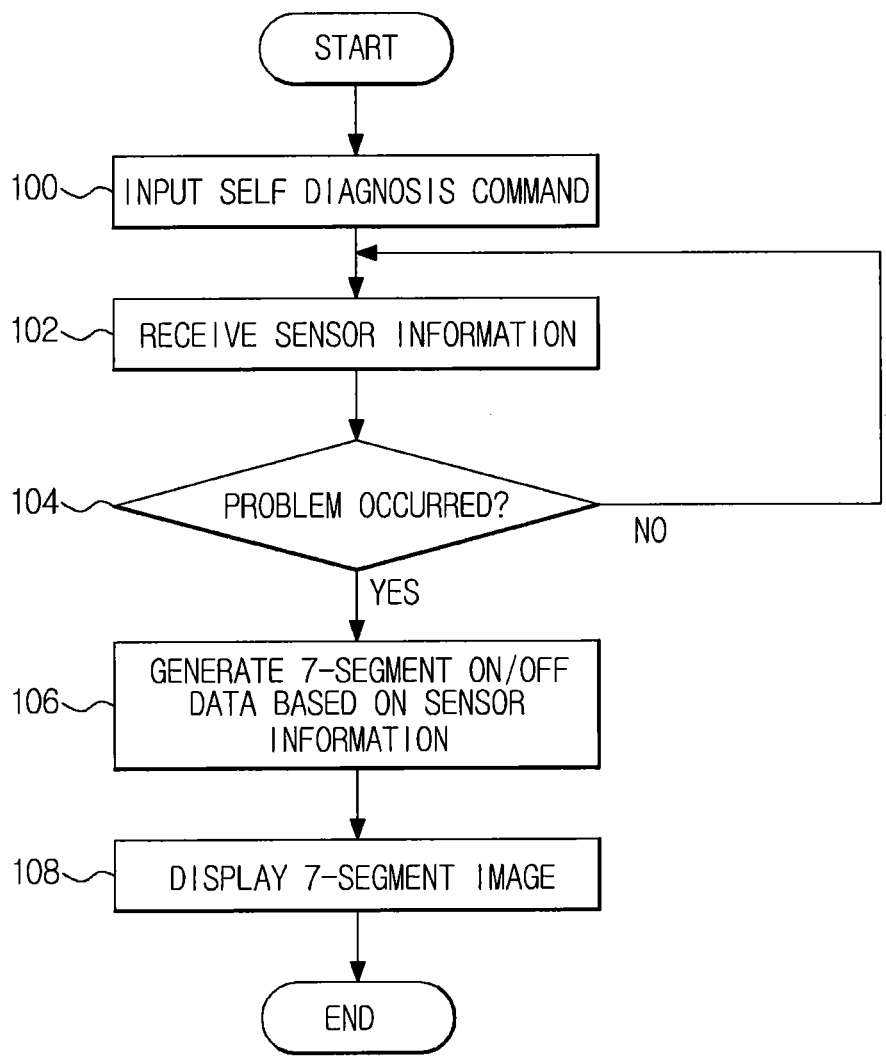
FIG. 5 is a flow chart showing a method of displaying self-diagnosis information of the home appliance according to the embodiment of the present disclosure.

FIG. 5 is a flow chart showing a method of displaying self-diagnosis information of the home appliance according to the embodiment of the present disclosure.

As shown in FIG. 5, a user manipulates a self-diagnosis button of the input unit 18 to input a command to execute self-diagnosis of the home appliance 10.

When a command to execute self-diagnosis of the home appliance 10 is input through the input unit 18 (100), the controller 22 controls the sensor unit 24 to detect various kinds of sensor information related to the operation of the home appliance 10.

The sensor unit 24 may detect various kinds of sensor information, i.e. a state of various loads (for example, a washing motor, a fan motor, a water temperature sensor, an air sensor, a condensing sensor, a water level sensor, a door, etc.) related to the operation of the home appliance 10, and may transmit the detected result to the controller 22.

The controller 22 receives the sensor information transmitted from the sensor unit 24 (102) and may determine self-diagnosis information related to the received sensor information, i.e. whether the home appliance 10 has a problem (104).

Upon determining at Operation 104 that the home appliance 10 does not have a problem, the procedure returns to Operation 102 where the controller 22 receives sensor information from the sensor 24 and performs subsequent operations.

Upon determining at Operation 104 that the home appliance 10 has a problem, the controller 22 encodes self-diagnosis information based on the received sensor information to generate 7-segment image information as shown in FIG. 4.

To this end, the controller 22 generates on/off data to generate 7-segment image information through the first generation unit 27 (106). The first generation unit 27 generates self-diagnosis information of the home appliance 10 using diagnosis data stored in the memory 20 and encodes the self-diagnosis information of the home appliance 10 to generate 7-segment on/off data.

The display unit 16 turns 7 LEDs on or off according to the 7-segment on/off data generated by the first generation unit 27 of the controller 22 to display self-diagnosis information regarding a problem state of the home appliance 10 as 7-segment images (108).

A method of providing service information through recognition and analysis of the self-diagnosis information displayed as 7-segment images as shown in FIGS. 4 and 5 will be described with reference to FIG. 6.

Figure 6:
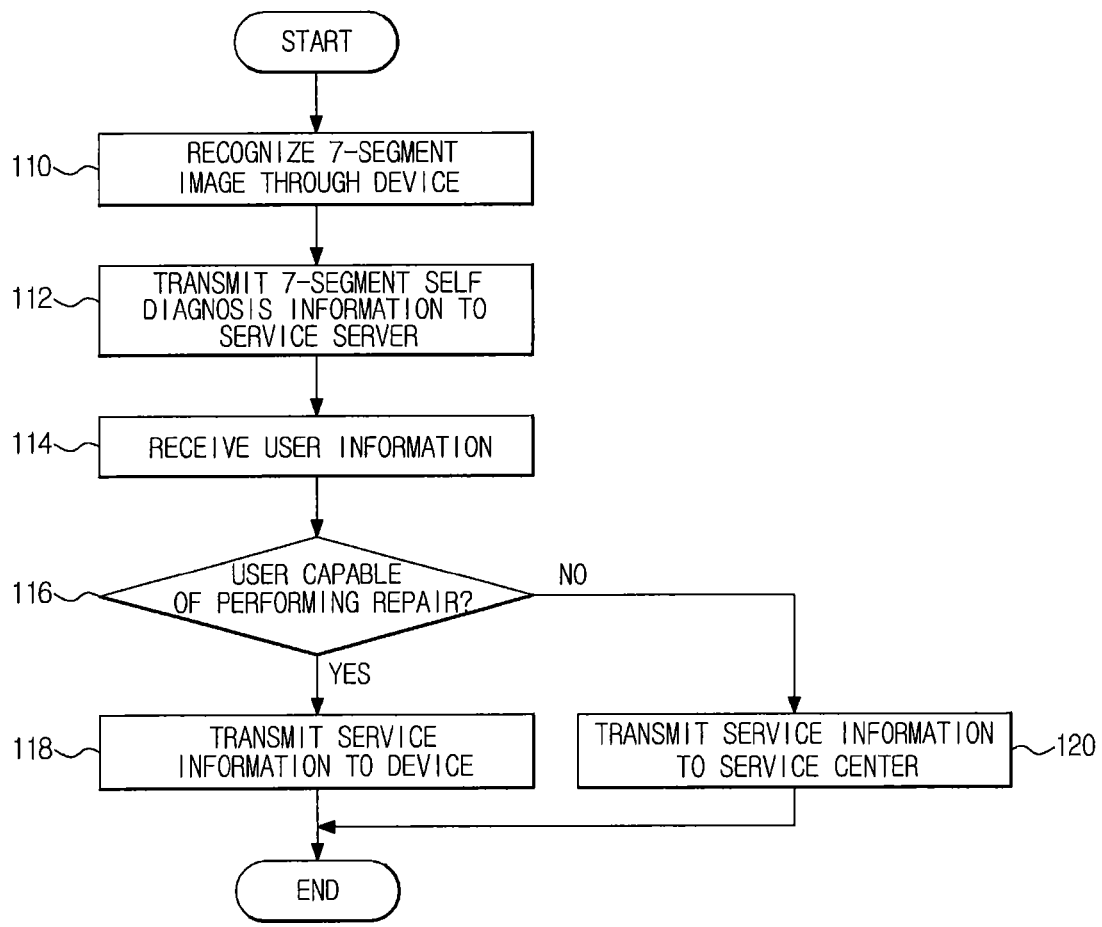
FIG. 6 is a flow chart showing a method of providing proper service information through self-diagnosis information recognition and analysis of the home appliance according to the embodiment of the present disclosure.

FIG. 6 is a flow chart showing a method of providing proper service information through self-diagnosis information recognition and analysis of the home appliance according to an embodiment of the present disclosure.

As shown in FIG. 6, the device 50 recognizes self-diagnosis information displayed on the display unit 16 of the home appliance 10 as 7-segment images by way of the camera (110), for example.

At this time, the device 50 removes noise from the 7-segment images using an application, for example, using an exclusive application incorporated therein, to correctly extract the self-diagnosis information.

Subsequently, the device 50 transmits the extracted 7-segment self-diagnosis information to the service server 60 using a secure communication protocol (112).

The service server 60 analyzes the self-diagnosis information transmitted from the device 50 and transmits diagnosis result information regarding a problem state of the home appliance 10, i.e. service information, to the device 50 or the service center 70.

The service server 60 transmits self-diagnosis result information, i.e. service information, to the device 50 or the service center 70 as follows.

First, upon receiving self-diagnosis information of the home appliance 10 through the device 50, the service server 60 also receives information regarding a user who uses the device 50 (114) and analyzes the received user information to extract user-tailored information.

When the user-tailored information is extracted, the service server 60 determines whether the user of the device 50 is capable of performing repair or interested in performing repair (116).

Upon determining at Operation 116 that the user is capable of or interested in performing repair, the service server 60 transmits service information, i.e. diagnosis result information regarding a problem state of the home appliance 10, to the device 50 (118). At this time, the service server 60 may provide the service information to the device 50 in the form of a video so that the user may easily deal with the problem of the home appliance 10. Consequently, the user may repair the home appliance 10 based on the diagnosis result information of the home appliance 10 transmitted to the device 50, thereby reducing service time and expenses.

On the other hand, upon determining at Operation 116 that the user is not capable of or not interested in performing repair, the service server 60 transmits service information, i.e. diagnosis result information regarding a problem state of the home appliance 10, to the service center 70 (120).

The service center 70 performs after-sales service based on the service information of the home appliance 10 transmitted from the service server 60. The after-sales service may be performed as follows. A held desk operator takes a visit reservation from a user and transmits the diagnosis result to a terminal of a service technician so that the service technician provides a rapid and correct service to the problem state of the home appliance 10.

Hereinafter, a method of displaying self-diagnosis information of the home appliance 10 using a QR code will be described with reference to FIGS. 7 and 8.

Figure 7:
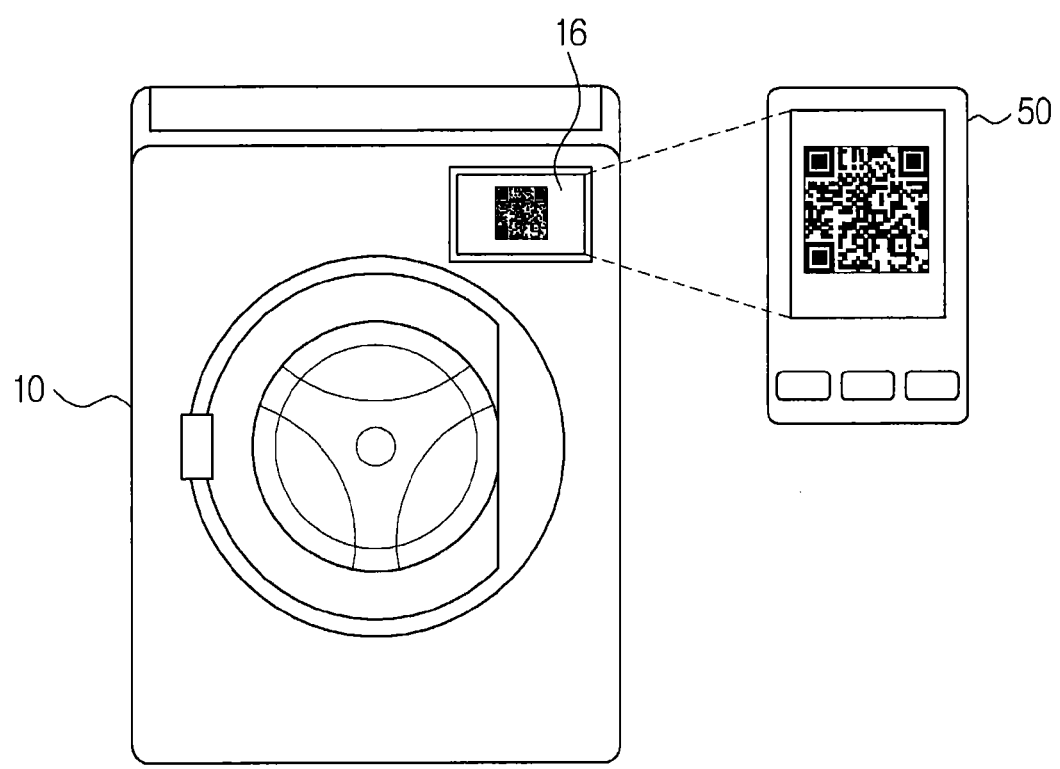
FIG. 7 is a view showing a self-diagnosis information image of a home appliance according to another embodiment of the present disclosure.

FIG. 7 is a view showing a self-diagnosis information image of a home appliance according to another embodiment of the present disclosure.

Referring to FIG. 7, self-diagnosis information of the home appliance 10 is displayed as a QR code.

The QR code is a matrix type two-dimensional barcode showing information using a black and white lattice pattern. The QR code is widely used in Japan. The name QR code originates from a registered trademark 'Quick Response' of Denso Wave Incorporated. The QR code is a two-dimensional barcode that overcomes limited capacity of a barcode, which has been conventionally used, and extends the form and content of the barcode. The QR code has information in horizontal and vertical directions to display much more self-diagnosis information of the home appliance 10.

Figure 8:
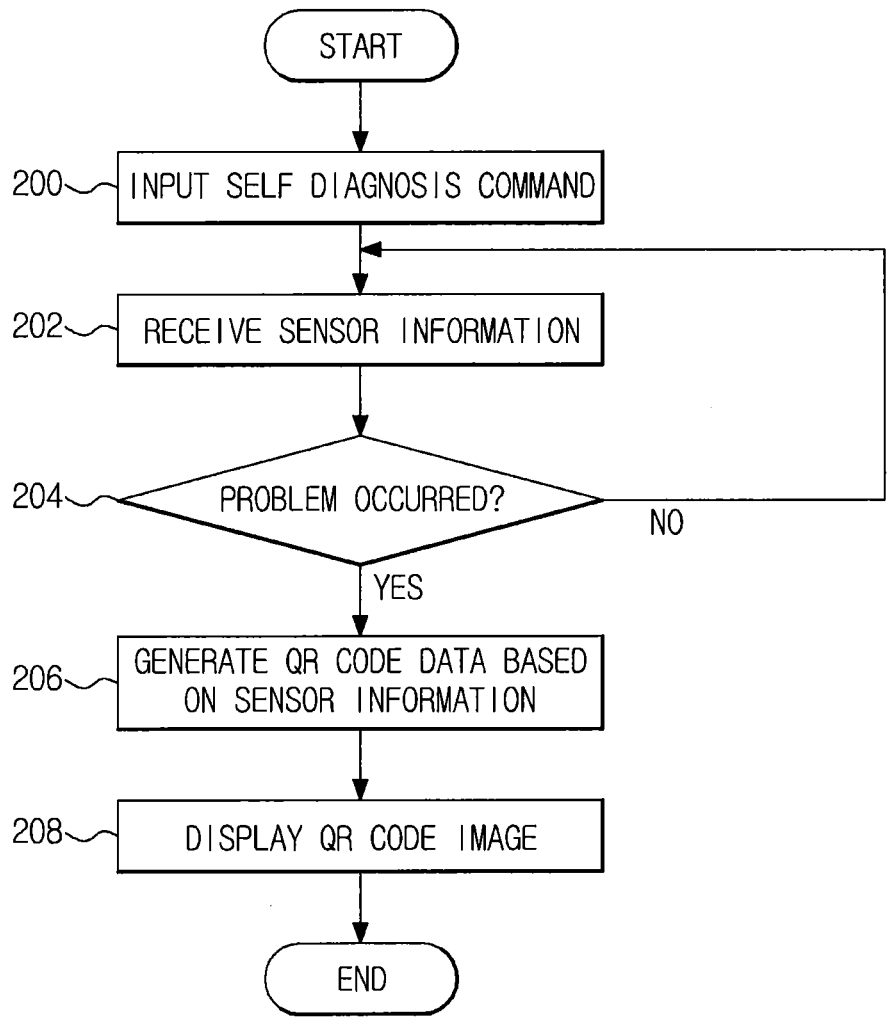
FIG. 8 is a flow chart showing a method of displaying self-diagnosis information of the home appliance according to the embodiment of the present disclosure.

FIG. 8 is a flow chart showing a method of displaying self-diagnosis information of the home appliance according to the embodiment of the present disclosure. A description of parts of FIG. 8 identical to those of FIG. 5 will be omitted.

As shown in FIG. 8, a user manipulates a self-diagnosis button of the input unit 18 to input a command to execute self-diagnosis of the home appliance 10.

When a command to execute self-diagnosis of the home appliance 10 is input through the input unit 18 (200), the controller 22 controls the sensor unit 24 to detect various kinds of sensor information related to the operation of the home appliance 10.

The controller 22 receives the sensor information transmitted from the sensor unit 24 (202) and determines self-diagnosis information related to the received sensor information, i.e. whether the home appliance 10 has a problem (204).

Upon determining at Operation 204 that the home appliance 10 does not have a problem, the procedure returns to Operation 202 where the controller 22 receives sensor information from the sensor 24 and performs subsequent operations.

Upon determining at Operation 204 that the home appliance 10 has a problem, the controller 22 encodes self-diagnosis information based on the received sensor information to generate QR code image information as shown in FIG. 7.

Also, the controller 22 generates QR code image information through the second generation unit 28 (206). The second generation unit 28 generates self-diagnosis information of the home appliance 10 using diagnosis data stored in the memory 20 and encodes the self-diagnosis information of the home appliance 10 to generate QR code data.

The display unit 16 displays self-diagnosis information regarding a problem state of the home appliance 10 as a QR code image according to the QR code data generated by the second generation unit 28 of the controller 22 (208).

A method of providing service information through recognition and analysis of the self-diagnosis information displayed as the QR code as shown in FIGS. 7 and 8 will be described with reference to FIG. 9.

Figure 9:
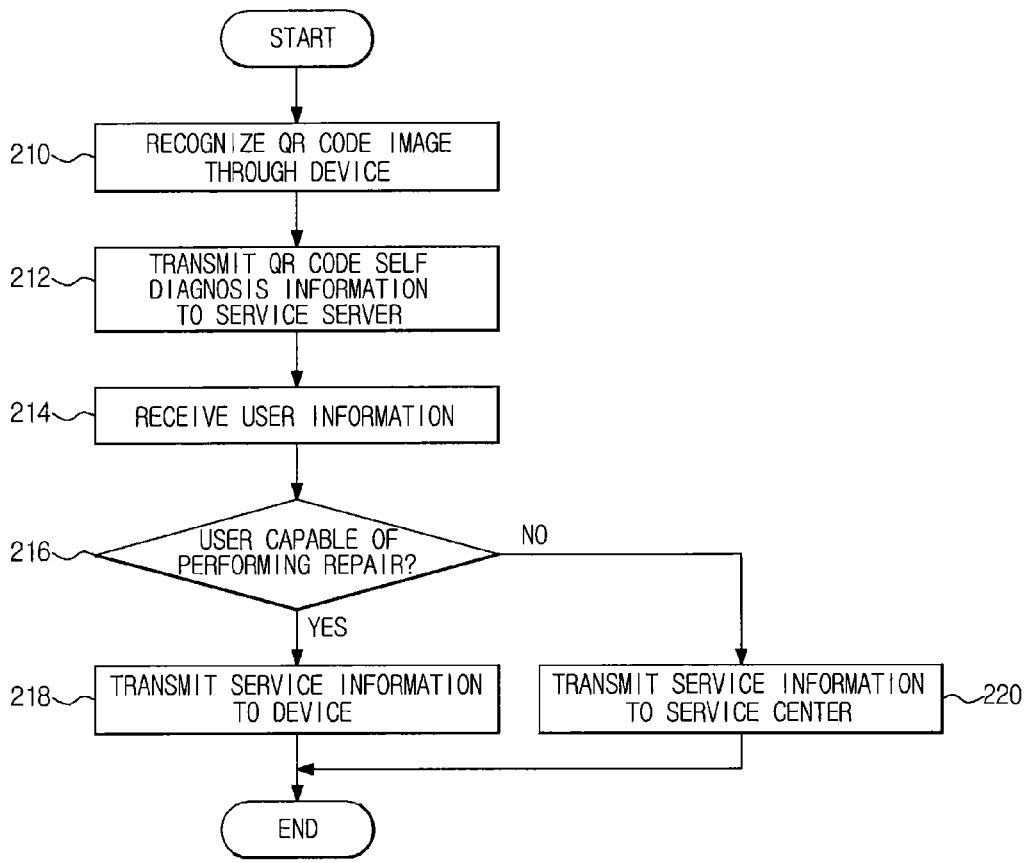
FIG. 9 is a flow chart showing a method of providing proper service information through self-diagnosis information recognition and analysis of the home appliance according to the embodiment of the present disclosure.

FIG. 9 is a flow chart showing a method of providing proper service information through self-diagnosis information recognition and analysis of the home appliance according to the embodiment of the present disclosure.

As shown in FIG. 9, the device 50 recognizes self-diagnosis information displayed on the display unit 16 of the home appliance 10 as a QR code image through the camera (210).

At this time, the device 50 removes noise from the QR code image using an exclusive application incorporated therein to correctly extract the self-diagnosis information.

Subsequently, the device 50 transmits the extracted QR code self-diagnosis information to the service server 60 using a secure communication protocol (IPSec) (212).

The service server 60 analyzes the QR code self-diagnosis information transmitted from the device 50 and transmits diagnosis result information regarding a problem state of the home appliance 10, i.e. service information, to the device 50 or the service center 70.

The service information is transmitted as follows. Upon receiving self-diagnosis information of the home appliance 10 through the device 50, the service server 60 also receives information regarding a user who uses the device 50 (214) and analyzes the received user information to extract user-tailored information.

When the user-tailored information is extracted, the service server 60 determines whether the user of the device 50 is capable of performing repair (216).

Upon determining at Operation 216 that the user is capable of performing repair, the service server 60 transmits service information, i.e. diagnosis result information regarding a problem state of the home appliance 10, to the device 50 (218). At this time, the service server 60 may provide the service information to the device 50 in the form of video so that the user may easily cope with the problem of the home appliance 10. Consequently, the user may repair the home appliance 10 based on the diagnosis result information of the home appliance 10 transmitted to the device 50, thereby reducing service time and expenses.

On the other hand, upon determining at Operation 216 that user is not capable of performing repair, the service server 60 transmits service information, i.e. diagnosis result information regarding a problem state of the home appliance 10, to the service center 70 (220).

The service center 70 performs after-sales service based on the service information of the home appliance 10 transmitted from the service server 60. As an example, the after-sales service may be performed as follows. A dedicated desk operator or receptionist may take a service call reservation from a user and may transmit the diagnosis result to a terminal of a service technician so that the service technician may provide rapid and accurate service to the malfunctioning home appliance 10.

Hereinafter, a method of outputting self-diagnosis information of the home appliance 10 using an LED or sound type Morse code will be described with reference to FIGS. 10 and 11.

Figure 10:
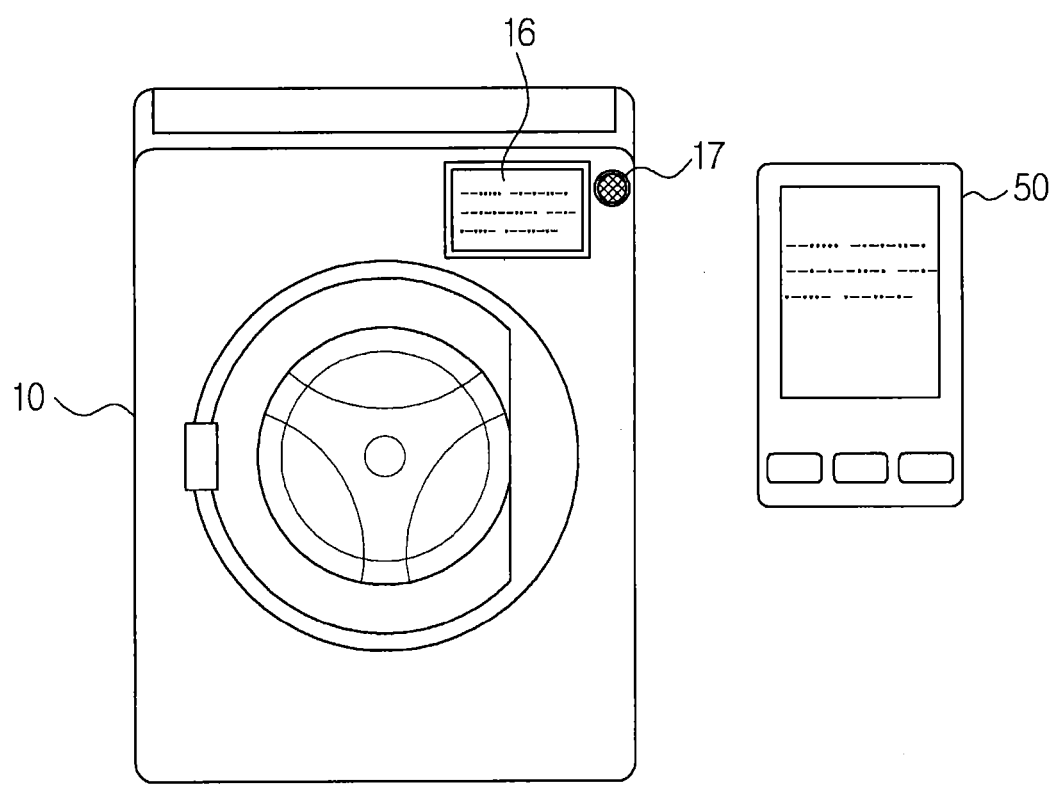
FIG. 10 is a view showing self-diagnosis information output from a home appliance according to a further embodiment of the present disclosure.

FIG. 10 is a view showing self-diagnosis information output from a home appliance according to a further embodiment of the present disclosure Referring to FIG. 10, self-diagnosis information of the home appliance 10 is output as an LED or sound type Morse code.

Morse code is a telegraphic code constituted by a combination of dots and dashes. Morse code is generally used for telegraphic communication through telegraph keys, which are operated by hand. A Morse code complying with international radio regulations (RR) is generated using letters and numbers to output much more self-diagnosis information in the form of a Morse code through blinking LEDs of the display unit 16 or through the output of sound from a speaker 17.

Figure 11:
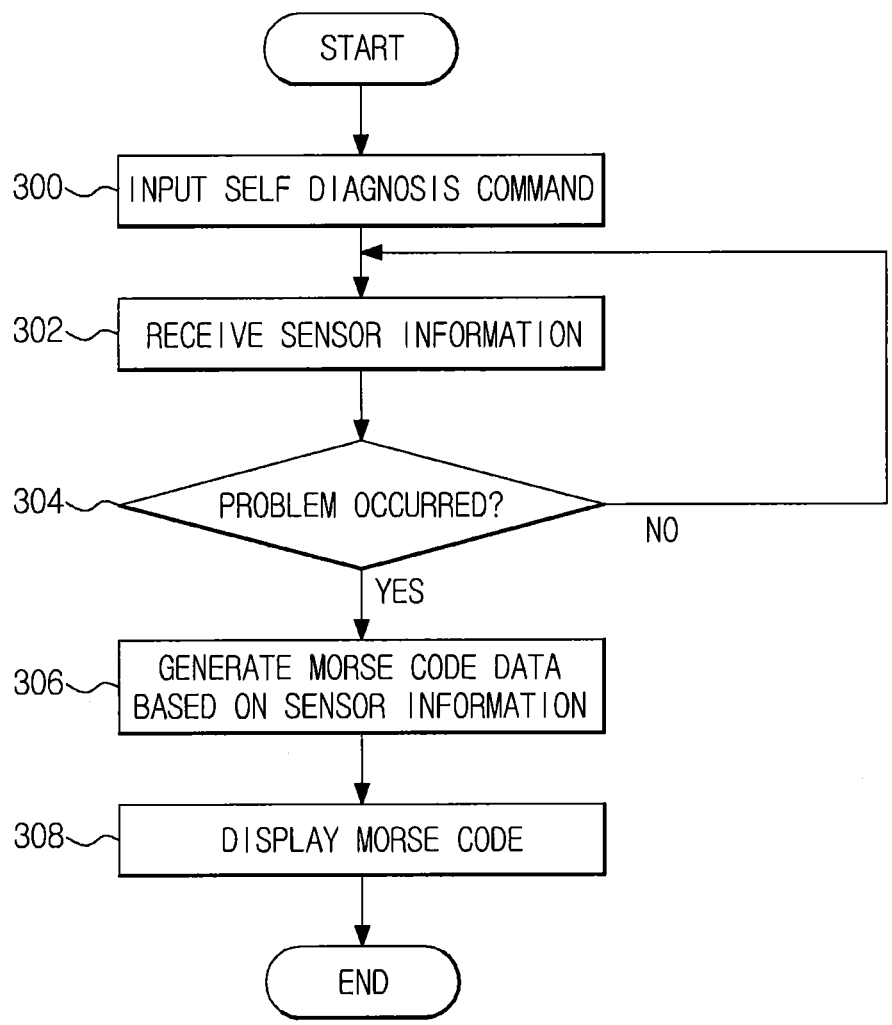
FIG. 11 is a flow chart showing a method of outputting self-diagnosis information of the home appliance according to the embodiment of the present disclosure.

FIG. 11 is a flow chart showing a method of outputting self-diagnosis information of the home appliance according to the embodiment of the present disclosure Portions of the description of FIG. 11 are identical to those of FIGS. 5 and 8 will therefore be omitted.

As shown in FIG. 11, a user manipulates a self-diagnosis button of the input unit 18 to input a command to execute self-diagnosis of the home appliance 10.

When a command to execute self-diagnosis of the home appliance 10 is input through the input unit 18 (300), the controller 22 controls the sensor unit 24 to detect various kinds of sensor information related to the operation of the home appliance 10.

The controller 22 receives the sensor information transmitted from the sensor unit 24 (302) and determines self-diagnosis information related to the received sensor information, i.e. whether the home appliance 10 has a problem (304).

Upon determining at Operation 304 that the home appliance 10 does not have a problem, the procedure returns to Operation 302 where the controller 22 receives sensor information from the sensor 24 and performs subsequent operations.

Upon determining at Operation 304 that the home appliance 10 has a problem, the controller 22 encodes self-diagnosis information based on the received sensor information to generate LED or sound type Morse code output information as shown in FIG. 10.

Also, the controller 22 generates LED or sound type Morse code output information through the third generation unit 29 (306). The third generation unit 29 generates self-diagnosis information of the home appliance 10 using diagnosis data stored in the memory 20 and encodes the self-diagnosis information of the home appliance 10 to generate LED or sound type Morse code data.

The display unit 16 outputs self-diagnosis information regarding a problem state of the home appliance 10 as an LED or sound type Morse code according to the LED or sound type Morse code data generated by the third generation unit 29 of the controller 22 (308).

A method of providing service information through recognition and analysis of the self-diagnosis information output as the LED or sound type Morse code as shown in FIGS. 10 and 11 will be described with reference to FIG. 12.

Figure 12:
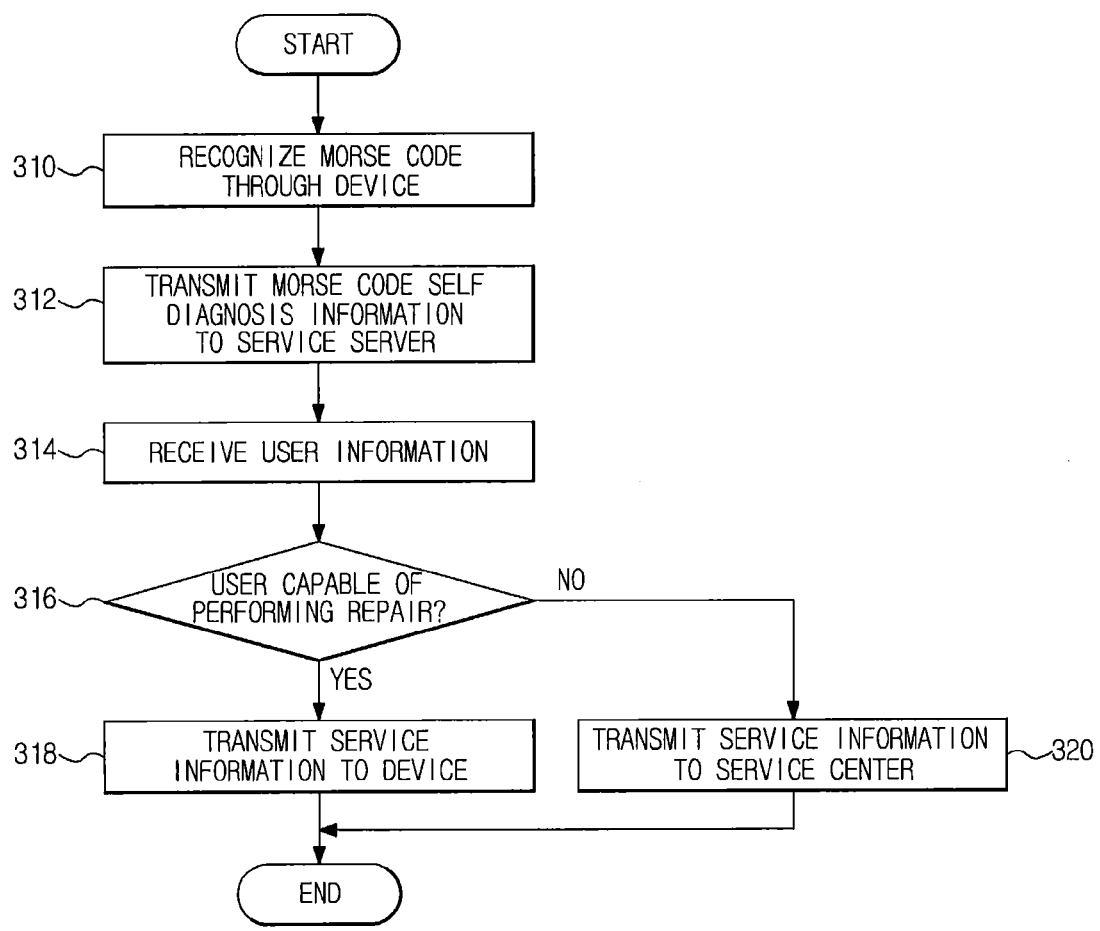
FIG. 12 is a flow chart showing a method of providing proper service information through self-diagnosis information recognition and analysis of the home appliance according to the embodiment of the present disclosure.

FIG. 12 is a flow chart showing a method of providing proper service information through self-diagnosis information recognition and analysis of the home appliance according to the embodiment of the present disclosure.

As shown in FIG. 12, the device 50 recognizes self-diagnosis information displayed on the display unit 16 of the home appliance 10 as an LED or sound type Morse code through the camera (310).

At this time, the device 50 removes noise from the LED or sound type Morse code using an exclusive application incorporated therein to correctly extract the self-diagnosis information.

Subsequently, the device 50 transmits the extracted LED or sound type Morse code self-diagnosis information to the service server 60 using a secure communication protocol (312).

The service server 60 analyzes the LED or sound type Morse code self-diagnosis information transmitted from the device 50 and transmits diagnosis result information regarding a problem state of the home appliance 10, i.e. service information, to the device 50 or the service center 70.

The service information is transmitted as follows. Upon receiving self-diagnosis information of the home appliance 10 through the device 50, the service server 60 also receives information regarding a user who uses the device 50 (314) and analyzes the received user information to extract user-tailored information.

When the user-tailored information is extracted, the service server 60 determines whether the user of the device 50 is capable of or interested in performing repair (316).

Upon determining at Operation 316 that the user is capable of or interested in performing repair, the service server 60 transmits service information, i.e. diagnosis result information regarding a problem state of the home appliance 10, to the device 50 (318). At this time, the service server 60 may provide the service information to the device 50 in the form of video so that the user may easily deal with the problem of the home appliance 10. Consequently, the user may repair the home appliance 10 based on the diagnosis result information of the home appliance 10 transmitted to the device 50, thereby reducing service time and expenses.

On the other hand, upon determining at Operation 316 that user is not capable of or interested in performing repair, the service server 60 transmits service information, i.e. diagnosis result information regarding a problem state of the home appliance 10, to the service center 70 (320).

The service center 70 performs after-sales service based on the service information of the home appliance 10 transmitted from the service server 60. The after-sales service may be performed as follows. A help desk operator takes a service-call reservation from a user and transmits the diagnosis result to a terminal of a service technician so that the service technician may provide rapid and accurate service according to the problem state of the home appliance 10.

As is apparent from the above description, a self-diagnosis system of a home appliance and operation method of the same self-diagnose a state of a home appliance having a self-diagnosis function, display the diagnosed result as various images, such as a 7-segment image, QR code, and LED or sound type Morse code, recognize and analyze self-diagnosis information displayed as the images, and provide proper service information to a user or a service provider, thereby easily checking a problem cause of the home appliance. Also, a user who is capable of performing a repair may not bear additional after-sales service expenses. In addition, a service technician, who will visit to repair the home appliance, may pre-acquire correct information regarding a state of the home appliance and prepare parts which will be used to repair the home appliance, thereby reducing repair time and thus improving user convenience.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A self-diagnosis system of a home appliance, the self-diagnosis system comprising:
    a home appliance configured to display self-diagnosis state information as one selected from among a 7-segment image, quick response (QR) code, and LED-type Morse code;
    a service server to receive the self-diagnosis state information displayed as the 7-segment image, to analyze a problem state of the home appliance based on the received self-diagnosis state information, and to provide service information regarding the analyzed problem state of the home appliance; and
    a device that uses an optical reader or a camera configured to recognize the self-diagnosis state information displayed on the home appliance as the one selected from among the 7-segment image, quick response (QR) code, and LED-type Morse code, and to transmit the recognized self-diagnosis state information to the service server,
    wherein the home appliance comprises:
    a memory to store one or more pieces of diagnosis data constituting production information of the home appliance for self-diagnosis;
    an input unit to input a user command to perform the self-diagnosis of the home appliance;
    a sensor unit to detect various kinds of sensor information related to an operation of the home appliance if the user command to perform the self-diagnosis is input through the input unit;
    a controller to generate self-diagnosis state information by use of the sensor information detected by the sensor unit and the diagnosis data stored in the memory, and encode the generated self-diagnosis information, thereby generating information of one selected from among the 7-segment image quick response (QR) code, and LED-type Morse code; and
    a display unit to display the generated of one selected from among 7-segment image quick response (QR) code, and LED-type Morse code,
    wherein the sensor information detected through the sensor unit is information related to a normal state and a problem state of various loads related to the operation of the home appliance, and
    wherein the service server receives information regarding a user who uses the device and analyzes the received user information to determine whether the user is capable of repairing the home appliance, to transmit the service information to the device upon determining that the user is capable of repairing the home appliance or to transmit the service information to the service center upon determining that the user is not capable of repairing the home appliance.

2. The self-diagnosis system according to claim 1, wherein the display unit comprises a 7-segment image constituted by a combination of light emitting diodes (LEDs), and the controller independently turns the LEDs on or off to display the self-diagnosis state information of the home appliance through the display unit.

3. The self-diagnosis system according to claim 1, wherein the display unit comprises a plurality of 7-segment images constituted by a combination of LEDs, and the controller independently controls the 7-segment images to display the self-diagnosis state information of the home appliance through the display unit.

4. The self-diagnosis system according to claim 1, wherein the service server analyzes the self-diagnosis state information transmitted from the device and transmits service information obtained through diagnosis of a problem of the home appliance to the device or to a service center.

5. The self-diagnosis system according to claim 1, wherein the device uses a camera to recognize the self-diagnosis state information displayed on the home appliance as the 7-segment image.

6. The self-diagnosis system according to claim 5, wherein the device comprises an application to remove noise from the recognized 7-segment image.

7. The self-diagnosis system according to claim 1, wherein the device transmits and receives information to and from the service server through a network.

8. The self-diagnosis system according to claim 7, wherein the network comprises any one of a ZigBee network, a WiFi network, a Bluetooth network and a mobile network.

9. An operation method of a self-diagnosis system of a home appliance, the method comprising:
    inputting a user command to perform a self-diagnosis of the home appliance;
    detecting various kinds of sensor information related to an operation of the home appliance if the user command to perform the self-diagnosis is input;
    self-diagnosing a state of the home appliance according to the detected sensor information and diagnosis data stored in a memory, and displaying the state of the home appliance as self-diagnosis state information selected from among one of a 7-segment image, the QR code, and the LED-type Morse code;
    recognizing self-diagnosis state information displayed as one selected from among the 7-segment image, the QR code, and the LED-type Morse code through a device comprising an optical reader or a camera;
    receiving the self-diagnosis state information recognized through the device and analyzing a problem state of the home appliance based on the received self-diagnosis state information; and
    providing service information regarding the analyzed problem state of the home appliance,
    wherein the providing the service information comprises:
    receiving information regarding a user who uses the device;
    analyzing the received user information to determine whether the user is capable of repairing the home appliance;

transmitting the service information to the device upon determining that the user is capable of repairing the home appliance; and transmitting the service information to the service center upon determining that the user is not capable of repairing the home appliance.

10. The operation method according to claim 9, wherein the displaying the self-diagnosis state information as the 7-segment image comprises:

generating self-diagnosis state information using diagnosis data stored in a memory;

encoding the self-diagnosis state information to generate 7-segment image information; and independently turning 7 LEDs on or off according to the generated 7-segment image information to display the self-diagnosis state information through a display unit.

11. The operation method according to claim 9, wherein the displaying the self-diagnosis state information as the 7-segment image comprises:

generating self-diagnosis state information using diagnosis data stored in a memory;

encoding the self-diagnosis state information to generate 7-segment image information; and independently controlling a plurality of 7-segment images according to the generated 7-segment image information to display the self-diagnosis state information through a display unit.

12. The operation method according to claim 9, wherein the providing the service information comprises analyzing the recognized self-diagnosis state information and transmitting service information obtained through diagnosis of a problem of the home appliance to the device or a service center.

* * * * *